Figure 1:
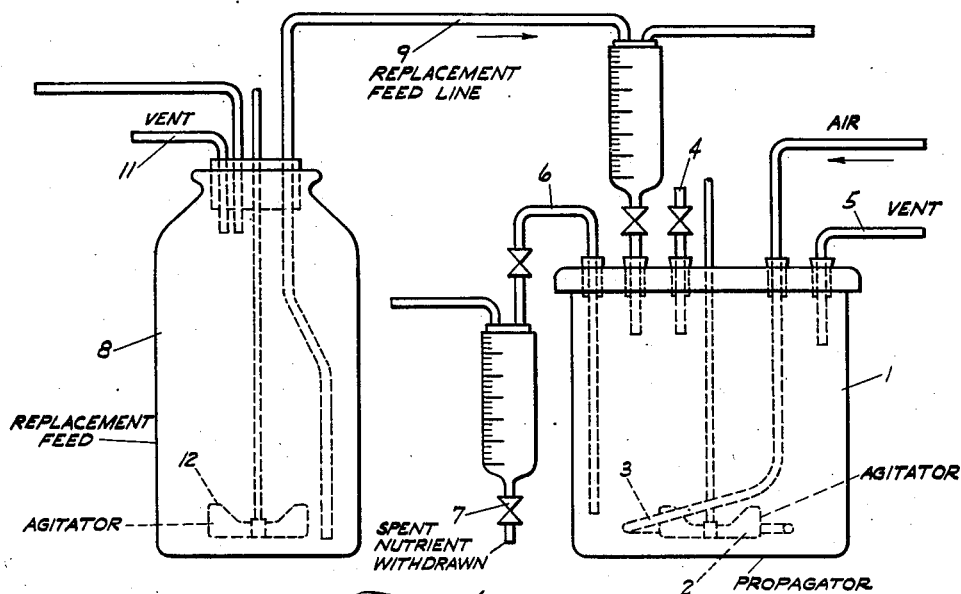

Sept. 2, 1952  P. J. KOLACHOV ET AL  2,609,327
CONTINUOUS PROCESS FOR PENICILLIN PRODUCTION
Filed Dec. 10, 1948  2 SHEETS—SHEET 2

Inventor
PAUL KOLACHOV and
WILLIAM C. SCHNEIDER
By Arthur Robert
Attorney

Patented Sept. 2, 1952

2,609,327

UNITED STATES PATENT OFFICE 2,609,327

CONTINUOUS PROCESS FOR PENICILLIN PRODUCTION

Paul J. Kolachov and William C. Schneider, Louisville, Ky., assignors to Joseph E. Seagram & Sons, Inc., Shively, Ky., a corporation of Indiana Application December 10, 1948, Serial No. 64,684

9 Claims. (Cl. 195—36)

The present invention relates to the production of penicillin, and relates in particular to a continuous process for penicillin production.

The production of penicillin has progressed from the early surface culture methods, to the submerged culture method in use at the present time. A large number and variety of nutrients have been employed in successful attempts to increase penicillin yield. Prior workers in this art have noted that the production of penicillin from mold in submerged culture is characterized by three phases from the standpoint of penicillin production. In the first phase there is an increase in mycellium and a slight penicillin production. In the second phase the maximum concentration of penicillin develops, and in the third phase, the penicillin level or concentration falls off due to decomposition of the penicillin for some unknown reason. It is, therefore, necessary in commercial operations to arrest the fermentation after about 72 to 96 hours, which is about the time the maximum penicillin concentration is attained, to obtain the maximum concentration and yield of penicillin, and in all cases the submerged culture has been carried out in batches. Cultures of penicillin producing mold are subject to contamination by bacteria which produce an enzyme that rapidly decomposes penicillin, and in event of contamination of a batch a large loss in production in the whole batch may occur. In spite of the evident benefits of a continuous process in reducing losses, where contamination occurs, heretofore, attempts to continue the production of penicillin into the third stage by the addition of nutrient have not been successful in preventing a falling penicillin concentration.

Glucose was early used as a nutrient, and it was later found that replacement of glucose by lactose, which is less rapidly assimilated by the mold, resulted in an increased concentration and yield of penicillin in the second phase. However, there appears to be no correlation between the amount of lactose assimilated and the amount of penicillin produced. Koffler et al., J. Bact., 50, 517-48 (1945), carried out the submerged culture of mold in a nutrient comprising corn steep liquor and lactose, and found that the presence of 5 g. per liter of glucose in the nutrient gave a further increase in yield in the second phase. An increase in yield in the second phase was also obtained by Moyer et al., J. Bact., 51, 79-93 (1946) by the addition of glucose during the fermentation. However, these workers encountered a falling off in penicillin concentration or level after the second phase, and they failed to indicate any way in which the third phase of the process and its characteristic falling of penicillin level could be eliminated. This characteristic of the fermentation would indicate that a continuous process for the production of penicillin was not possible.

It is an object of the present invention to provide a process for producing penicillin from molds which may be operated continuously by the introduction of fresh nutrient to a fermentation batch and withdrawal of spent nutrient containing penicillin, at substantially the same rate.

Another object is the elimination of the third stage of the penicillin batch process characterized by a decreasing penicillin level.

The present invention is based upon our discovery that the decreasing level or concentration of penicillin characteristic of the third stage may be eliminated by adding gradually to the submerged culture fermentation or propagator tank a nutrient solution containing a slowly assimilable sugar, such as lactose, a more rapidly utilizable sugar, such as glucose, and a suitable nitrogenous material. In addition, the nutrient solution added may contain an insoluble antiacid material, and if desired, a precursor may be added. A precursor is understood in the art as meaning a substance which favors or induces the production of a particular kind of penicillin. This nutrient solution is added gradually during the first or second stages of the fermentation process and results in the production of penicillin at a high rate as long as the proper addition of nutrient solution is maintained. By continuously or intermittently withdrawing increments from the fermentation tank at the same rate as additional nutrient solution is added, the process may be rendered continuous with a high level of penicillin production as great as, or even greater than, that obtained in the batch process. Furthermore, this high level is stable and continues throughout the continuous process. From the withdrawn nutrient solution penicillin may be recovered or isolated in known manner.

The process may be continued for an indefinite period, or until accidental contamination occurs. By making periodic tests or assays of the spent nutrient liquor as it is withdrawn from the mother liquor, contamination or deterioration of the mother liquor is quickly detected, and in the event contamination or deterioration occurs, the mother liquor can be discarded economically as it represents only a relatively small volume. The feed of nutrient then can be shifted to a standby propagator containing a fresh mother liquor, or the same propagator can be quickly cleaned and sterilized, charged with a new mother liquor and the process continued.

Decomposition of the penicillin, which occurs in the submerged batch process when the growth of mold is allowed for too long a period, apparently does not occur in our submerged process. In a batch process the action of the mold on the two sugars appears to be preferential with the rapidly assimilable sugar being consumed first. We believe that the improved results obtained in the operation of the process according to our invention are due to the maintenance of a low concentration of the rapidly assimilable sugar throughout the entire continuous operation, together with an adequate concentration of the slowly assimilable sugar. While we have not determined precisely the critical or minimum concentration of the rapidly assimilable sugar and the ratio of the slowly assimilable sugar to rapidly assimilable sugar required to enable the process to be operated continuously for an indefinite time, a ratio of 6:1 on a weight basis in the feed liquor has been found satisfactory, and an excess of the slowly assimilable sugar appears to entail no disadvantage other than cost. The presence of the more rapidly assimilable sugar in our process together with the lactose or other slowly assimilable sugar and nitrogenous material, apparently results in accelerating the mycellium production and its development to the penicillin producing stage. During the operation of the continuous process according to our invention, the growth of mold to the penicillin producing stage, and production of penicillin, occur substantially simultaneously or continuously in the nutrient mass or mother liquor without a decrease or falling off of the penicillin concentration, and the presence of the small proportion of rapidly assimilable sugar apparently has no retarding action on the production of penicillin. Attempts to operate continuously by addition of the slowly assimilable sugar and nitrogenous nutrient without the presence of the rapidly assimilable sugar results in a rapid lengthening of the operating cycle and reduction of the penicillin level.

In carrying our invention into practice, techniques applied to the submerged culture batch method are advantageously employed. Thus, for example, the mother liquor is aerated and agitated, anti-acid materials, such as calcium carbonate, and anti-foaming agents such as mixed lard oil and octadecanol, may be employed, and precursors may be added if desired. Also, any known organic nitrogenous nutrient, such as cotton seed meal, wheat extracts, wheat stillage, etc., may be employed in place of corn steep solids, and inorganic salts and trace elements may be added. Any of the various known strains of penicillin producing molds, such as *Penicillium notatum* or *Penicillium notatum-chrysogenum* may be employed in the invention.

Glucose appears to be the most effective of the rapidly assimilable sugars, and is preferred in our invention. However, other monoses assimilated more readily than lactose may be employed in place of glucose, such as levulose or galactose.

The cycle of operation preferably employed is about forty-eight hours. That is nutrient is added to the mother liquor at such rate that the volume of mother liquor would be doubled at the end of forty-eight hours. However, withdrawals are made at substantially the same rate so that the volume of mother liquor actually remains substantially constant. The additions of nutrient and withdrawals from the mother liquor may be continuous, or either or both may be intermittent. If both additions and withdrawals are intermittent, the withdrawal should immediately precede the addition of new nutrient. The invention is not limited to a 48-hour cycle because it is obvious that by accelerating the growth of the mold and penicillin synthesis, as by the use of other rapidly utilizable sugars or greater proportions of glucose, the operating cycle may be varied. Phenylacetic acid is known to favor the production of penicillin G and may be used as a precursor for this purpose, or we may employ any of the precursors disclosed in United States Patents Numbers 2,440,356 to 2,440,361, if desired. The precursor, if employed, preferably is separately added intermittently or continuously.

Figure 2:
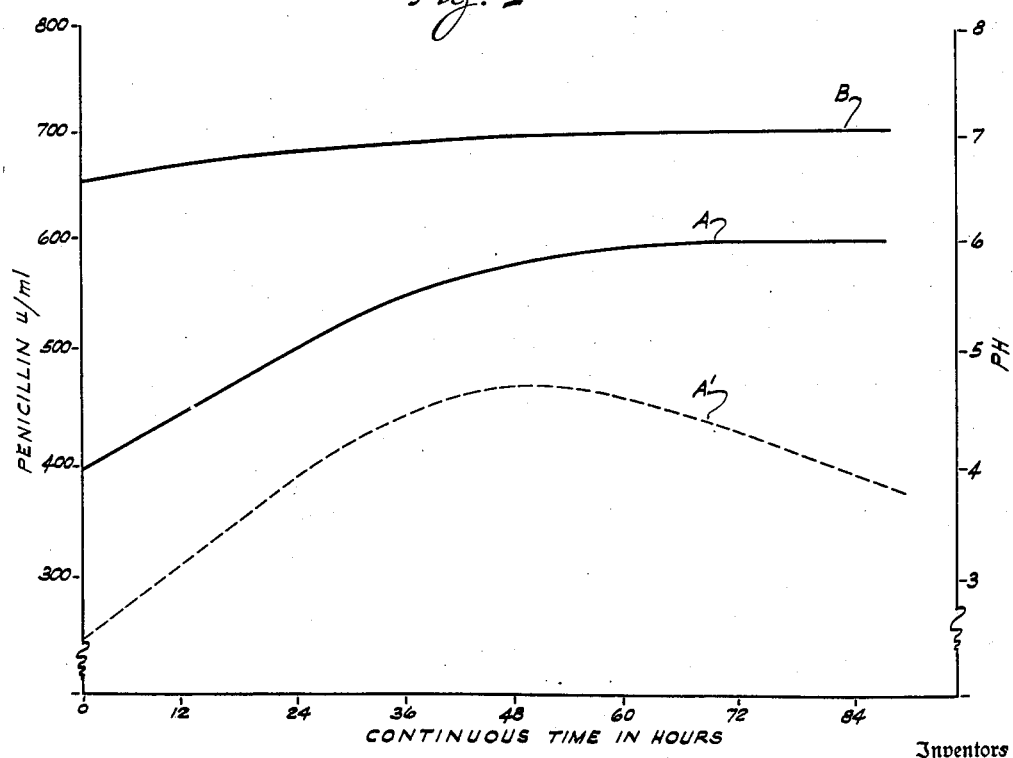

In the accompanying drawing, wherein is shown an apparatus by way of example, for carrying out the invention, Figure 1 is a partly diagrammatic view of an apparatus for carrying out the invention;

Figure 2 graphically illustrates the results of the invention; and

Figure 3:
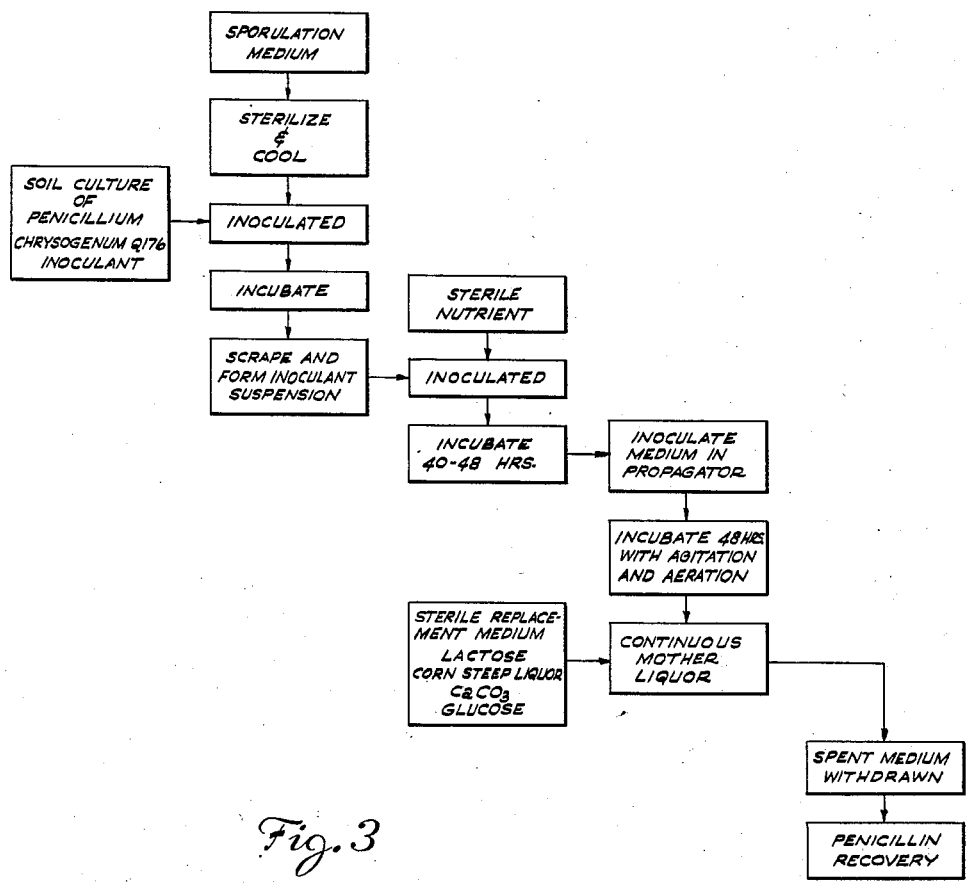

Figure 3 is a flow sheet illustrating the invention.

The invention will be described in greater detail in connection with the accompanying drawing and the following specific example of a preferred practical application of the invention by way of example.

Referring to the drawing, the propagator or fermenter 1, which may be of any suitable size and shape, is equipped with an agitator 2 driven by any suitable source of power, and an aeration coil or ring 3 by which air is introduced in finely divided streams near the bottom of the propagator. Filtered or sterilized air is supplied to the propagator from any suitable source, preferably at the rate of one volume of air per minute per volume of medium. That is, employing twelve liters of solution, air is supplied at the rate of twelve liters per minute. This rate is generally considered as providing an ample supply of air for submerged culture. The propagator is also equipped with a valved conduit 4 for introduction of an anti-foam agent and precursor, and with a vent 5 for escape of excess air and other gas. A conduit 6 may be provided for withdrawal of spent nutrient, and is provided with a sample draw off valve 7.

The replacement feed or nutrient medium may be contained in a vessel 8 connected through a suitable tube or conduit 9, extending from the bottom of vessel 8 to the propagator. As illustrated, the replacement medium in vessel 8 is maintained under slight pressure and the nutrient is supplied by conduit 9 to the vessel 1. A vent 11 may be provided to regulate or control the air pressure in vessel 8, and the vessel may be equipped with a suitable agitator 12. The air supplied is suitably filtered or sterilized.

*Example*

A sporulation medium is prepared from

| | Grams |
|---|---|
| Sodium nitrate ($NaNO_3$) | 3 |
| Dihydrogen potassium phosphate ($KH_2PO_4$) | 0.5 |
| Magnesium sulfate heptahydrate ($MgSO_4.7H_2O$) | 0.25 |
| Sucrose | 20 |
| Agar | 25 | diluted with water to make one liter. This medium is heat sterilized, and upon cooling and congealing of the agar there are added soil cultures of *Penicillium chrysogenum* Q 176. This medium is incubated by surface culture technique for about four or five days at about 25° C. The surface of the medium then is scraped to remove the spores, using about 25 cc. wash water, and the wash water containing the spores in suspension then is added to a sterile nutrient containing about 6 per cent. dextrin and 2 per cent. corn steep liquor solids in 150 cc. water, in the proportion of about 5 cc. of the above suspension. This nutrient then is incubated in a cotton stoppered flask on a shaker at about 23–26° C. for about 40 to 48 hours. Four such flasks are prepared and their contents (a total of about 600 cc.) then are transferred to the propagator or fermenter 1 containing about 12 liters of a sterile nutrient medium made up as described below, except that the glucose is omitted. In the propagator the mold is incubated for about 48 hours with agitation and aeration, whereupon the replacement or feed medium is substantially continuously introduced by conduit 9 and the spent culture medium is substantially continuously withdrawn by the conduit 6 at about the same rate as new medium is introduced. Where the time cycle is 48 hours, the content of the propagator is twelve liters, the rate of introduction of replacement medium and of withdrawal of culture medium is about twelve liters in 48 hours, or about one-fourth liter per hour. If desired, the introduction of new medium and withdrawal of spent culture medium may be made intermittently at the proper rate.

One hundred liters of an aqueous replacement feed medium containing the following ingredients is prepared:

| | Grams per L. |
|---|---|
| Lactose | 30 |
| Corn steep liquor solids | 30 |
| Calcium carbonate powder | 10 |
| Glucose | 5 |

Caustic soda (to adjust pH to about 6).

The nutrient is placed in container 8, sterilized, and then cooled and is supplied to the propagator from this container. The above described process is illustrated by the flow diagram in Figure 3.

Referring to Figure 2, the curve A represents the concentration of penicillin in the mother liquor or propagator in terms of Oxford units per milliliter. The point zero represents the condition at the commencement of the continuous process, that is, after a 48-hour incubation, and before any addition of replacement nutrient, and at this time the penicillin is present in a concentration of about 380 units per ml. This point is well within the second phase of the process. As the fermentation proceeds, concentration of penicillin rises during the time that replacement feed is being added and spent liquor is removed, and levels off after about sixty hours to a concentration of about 600 units per ml. It will be understood that if the incubation period were further extended before adding replacement feed medium the concentration of penicillin would be higher at the start of the continuous process, and a correspondingly richer fraction could be withdrawn. During the entire period indicated by the diagram, the pH lies closely adjacent 7, as shown by curve B, and the ammonia level or concentration, after about thirty-six hours, reaches a plateau of about 22 mg. per 100 ml.

In comparison with these results, curve A' shows the penicillin concentration in a continuous process when there is no glucose present in the replacement nutrient. From an initial concentration or level of about 150 units the penicillin concentration rises to a maximum of about 475 units at the end of 48 hours and then decreases. Thus, the maximum penicillin level is 475 Oxford units per milliliter. No particular significance can be attached to the fact that in the two curves the penicillin levels differ at the zero point because in each case the nutrients at this point are alike, and variations of this degree may be encountered in practice. However, the leveling of the penicillin curve A and of the pH curve B are characteristic of our process, and is contrasted to the characteristic rising pH curve and falling penicillin level of curve A' from a peak which occurs when operating at the same time cycle without the presence of glucose.

In the above specific example, the presence of one part of the rapidly assimilable glucose to six parts of the slowly assimilable lactose enables the process to be carried out continuously on a cycle of about 48 hours. However, the cycle of operation is dependent on the particular operating conditions and on the nature of the nutrients employed, and is not limited to 48 hours. Furthermore, by increasing the proportion of glucose to lactose, the operating cycle may be further reduced, although it is likely that a peak condition will be found after which greater proportions of glucose will result in lowered penicillin yields.

We claim as our invention:

1. A single stage continuous process for producing penicillin by submerged culture which comprises: fermenting penicillin-producing mold by submerged culture in a nutrient pool to build up a concentration of at least about 600 units penicillin per milliliter therein; then gradually adding to said pool a nutrient solution comprising a slowly assimilable sugar, and a rapidly assimilable sugar; and withdrawing penicillin containing solution from the pool at substantially the same rate as nutrient solution is introduced, the rate of addition of nutrient solution to the pool maintaining a substantially uniform level of penicillin concentration in the pool not below about 600 units per milliliter.

2. The process as specified in claim 1 wherein the slowly assimilable sugar is lactose.

3. The process as specified in claim 2 wherein the rapidly assimilable sugar is glucose.

4. The process as specified in claim 1 wherein the rapidly assimilable sugar is glucose.

5. The method as specified in claim 1 wherein during the fermentation of the pool prior to reaching penicillin concentration of said 600-unit, a nutrient solution comprising a slowly assimilable sugar and a rapidly assimilable sugar is added and penicillin-containing solution is withdrawn from the pool at substantially the same rate that nutrient solution is introduced.

6. The process as specified in claim 3 wherein the ratio of glucose to lactose is about 1:6.

7. The process as specified in claim 6 wherein the concentration of the glucose in the nutrient feed solution is about one-half per cent.

8. A single-stage continuous process for producing penicillin by submerged culture which comprises: fermenting a culture of penicillin-producing mold by submerged culture in a nutrient pool until a concentration of at least about 600 units penicillin per milliliter is produced therein; then gradually adding to the pool a nutrient solution comprising corn steep liquor, lactose and glucose, and withdrawing penicillin containing solution at substantially the same rate as nutrient solution is introduced, the rate of addition of nutrient to the pool maintaining a substantially uniform level of penicillin concentration in the pool not below about 600 units per milliliter.

9. A single-stage continuous process for producing penicillin by submerged culture which comprises: propagating and fermenting penicillin-producing mold by submerged culture in a nutrient pool until a substantially level concentration of at least about 600 units penicillin per milliliter is produced therein; then gradually adding to said pool a nutrient solution comprising lactose and a rapidly assimilable sugar; and withdrawing penicillin containing solution from the pool at substantially the same rate as nutrient solution is introduced, the rate of withdrawal of nutrient being such that the fermentation in the pool goes substantially to completion to maintain a substantially uniform level of penicillin concentration of at least 600 units in the pool.

PAUL J. KOLACHOV.
WM. C. SCHNEIDER.

REFERENCES CITED

The following references are of record in the file of this patent:

UNITED STATES PATENTS

| Number | Name | Date |
|---|---|---|
| 2,422,777 | Eisenberg et al. | June 24, 1947 |
| 2,440,355 | Behrens | Apr. 27, 1948 |
| 2,442,141 | Moyer | May 25, 1948 |
| 2,519,902 | Haller | Aug. 22, 1950 |
| 2,524,200 | Liebmann et al. | Oct. 3, 1950 |

FOREIGN PATENTS

| Number | Country | Date |
|---|---|---|
| 575,472 | Great Britain | Feb. 19, 1946 |

OTHER REFERENCES

Moyer et al.: "Penicillin," Journal of Bacteriology, vol. 51, 1946 (January), pages 86–87, 92.

Jarvis et al.: Journal American Chemical Society, vol. 69, Dec. 1947, pages 3010 to 3017.